(12) United States Patent
Hu

(10) Patent No.: US 8,089,526 B2
(45) Date of Patent: Jan. 3, 2012

(54) CIRCUIT FOR PROCESSING VIDEO SIGNAL

(75) Inventor: Ke-You Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 289 days.

(21) Appl. No.: 12/558,598

(22) Filed: Sep. 14, 2009

(65) Prior Publication Data

US 2010/0315551 A1    Dec. 16, 2010

(30) Foreign Application Priority Data

Jun. 15, 2009   (CN) .......................... 2009 1 0303261

(51) Int. Cl.
*H04N 5/235* (2006.01)
*H04N 5/04* (2006.01)
*H04N 9/475* (2006.01)
*H04N 5/06* (2006.01)
*H03L 7/00* (2006.01)

(52) U.S. Cl. ..................... 348/222.1; 348/500; 348/516; 348/521; 348/537; 348/540

(58) Field of Classification Search .................. 348/500, 348/294, 311, 312, 516, 521, 525, 537, 540, 348/547, 222.1, 495, 464, 207.99
See application file for complete search history.

(56) References Cited

U.S. PATENT DOCUMENTS

| | | | | |
|---|---|---|---|---|
| 5,568,191 A | * | 10/1996 | Yamada | 348/222.1 |
| 6,493,025 B1 | * | 12/2002 | Kiriyama et al. | 348/207.1 |
| 2010/0026844 A1 | * | 2/2010 | Hopkins | 348/231.2 |

* cited by examiner

*Primary Examiner* — Lin Ye
*Assistant Examiner* — Marly Camargo
(74) *Attorney, Agent, or Firm* — Altis Law Group, Inc.

(57) ABSTRACT

A circuit is used to process video signal from a video sensor. The video signal includes video content signal and synchronization signals. The circuit includes a status register, a data register, and a processor. The status register provides a sampling clock signal to the data register and the video sensor. The sampling clock signal is synchronized with the synchronization signals to sample the video signal. The status register stores the synchronization signals. The data register storing the video content signal. The processor is coupled to the status register and the data register. The processor reads the video content signal from the data register according to the synchronization signals in the status register.

6 Claims, 3 Drawing Sheets

CIRCUIT FOR PROCESSING VIDEO SIGNAL

BACKGROUND

1. Technical Field

The present disclosure relates to circuits for processing signals, and particularly to a circuit for processing a video signal.

2. Description of Related Art

With the development of semiconductor technology, more and more embedded application systems, such as digital cameras and video telephones, have the need to process video signals. However, because different embedded application systems usually have different video Input/output ports and different processors for processing video signals, the circuits in the embedded application systems are often complicated.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
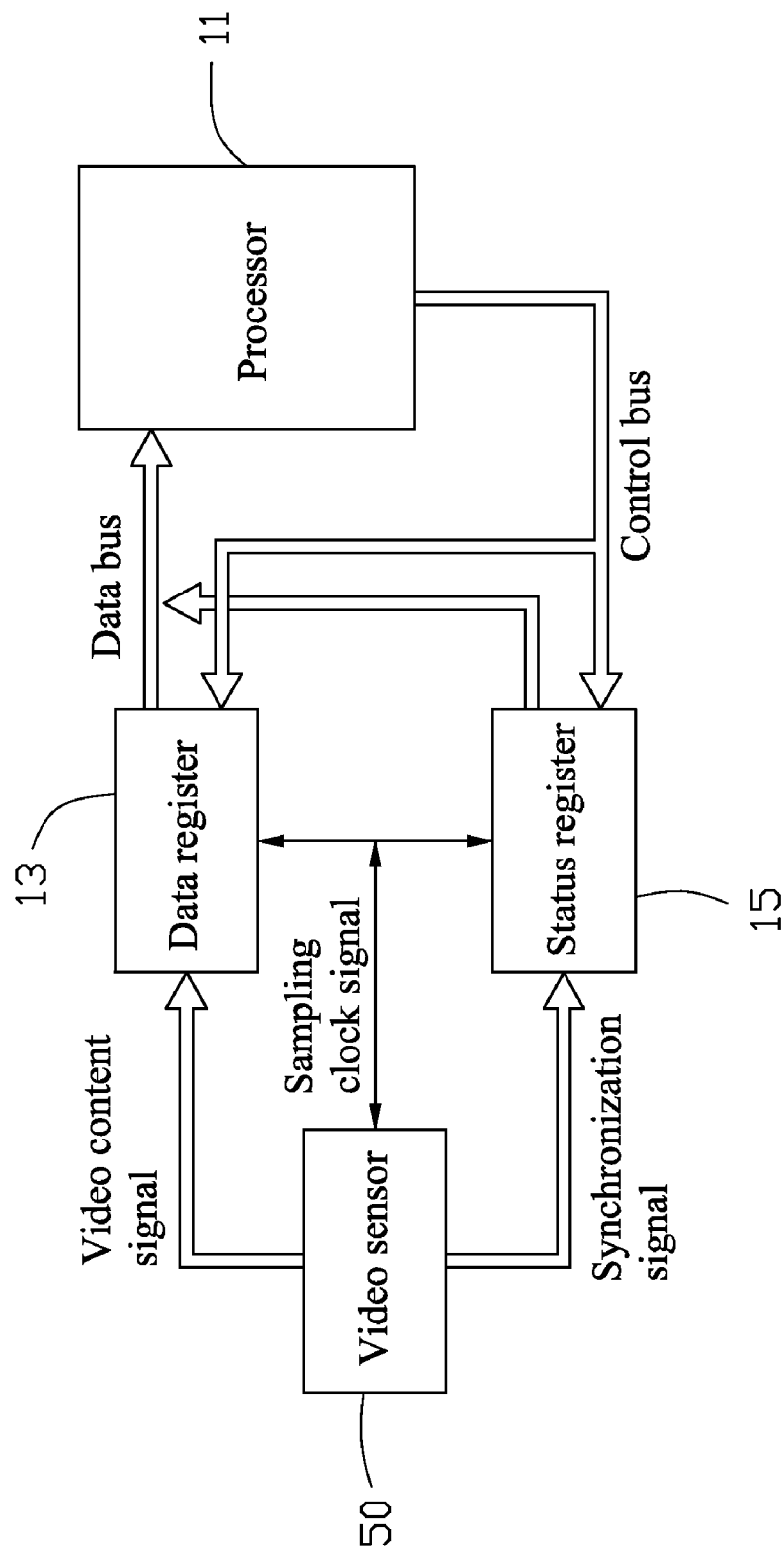
FIG. 1 is a block view of a circuit of an embodiment for processing a video signal.

Referring to FIG. 1, a circuit for processing a video signal, in accordance with an embodiment, includes a processor 11, a data register 13, a status register 15, and a video sensor 50. The data register 13 and the status register 15 are coupled to the processor 11 via a data bus for transferring data to the processor 11. The processor 11 is coupled to the data register 13 and status register 15 via a control bus for controlling the data register 13 and the status register 15. The video sensor 50 may be, for example, a Charge Coupled Device (CCD) sensor, or a Complementary Metal Oxide Semiconductor (CMOS) sensor.

Figure 2:
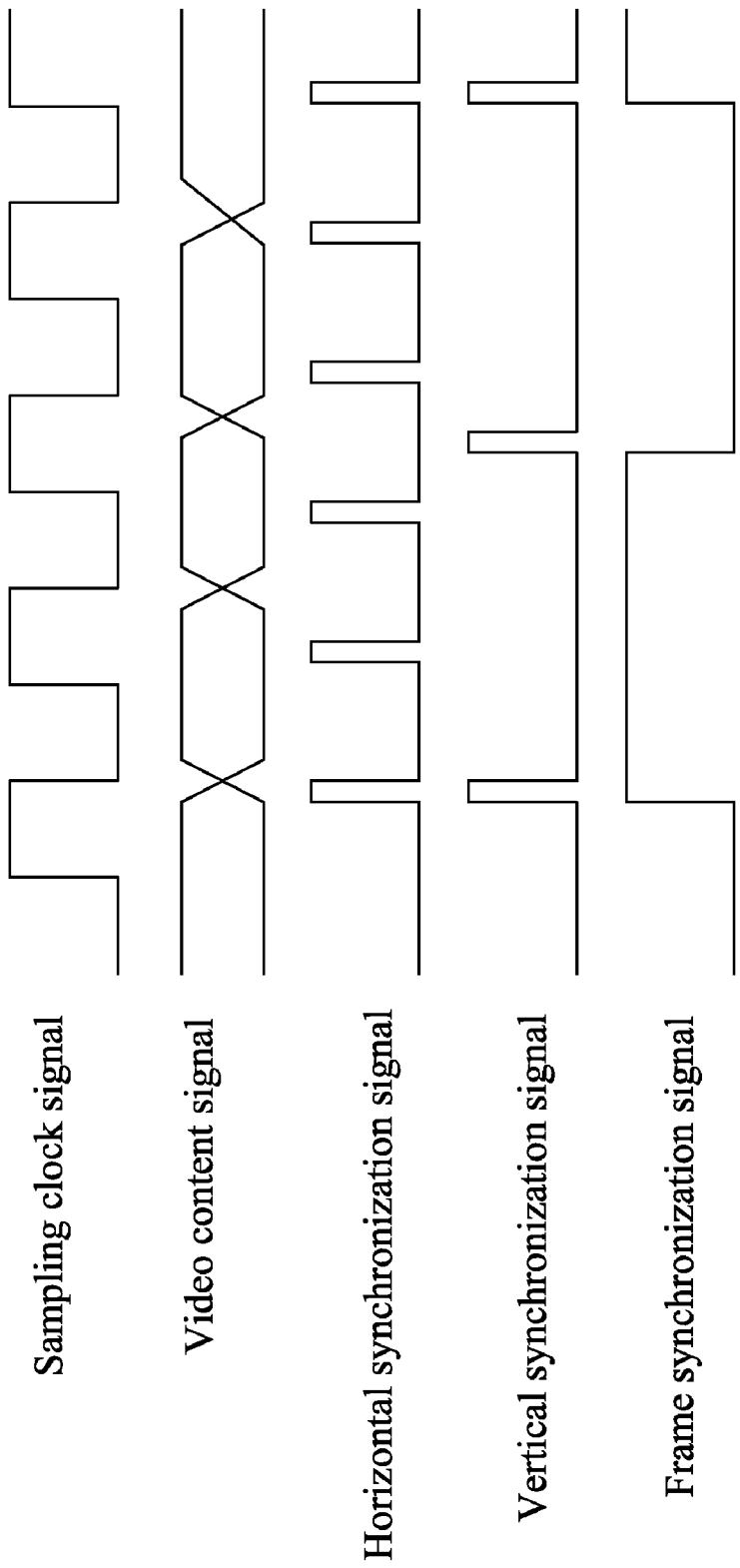
FIG. 2 is a sequence chart of the circuit of FIG. 1.

Referring to FIGS. 1 and 2, the video sensor 50 is coupled to the data register 13 and the status register 15 for sending video signal to the data register 13 and status register 15. The video signal includes video content signal, horizontal synchronization signal, vertical synchronization signal, and frame synchronization signal. The video content signal is transferred to the data register 13 from the video sensor 50. The horizontal synchronization signal, the vertical synchronization signal, and the frame synchronization signal are transferred to the status register 15 from the video sensor 50. The status register 15 provides a sampling clock signal to the data register 13 and the video sensor. The sampling clock signal is synchronized with the horizontal synchronization signal, the vertical synchronization signal, and the frame synchronization signal. The data register 13 and the status register 15 sample and store data at a rising edge of the sampling clock signal. The status register 15 has a state bit. After the data register 13 stores data, the state bit is set to one to allow the processor to read data from the data register 13. After the processor 11 reads data from the data register 13, the state bit is set to zero to prevent the processor 11 from reading the data from the register 13 again.

Figure 3:
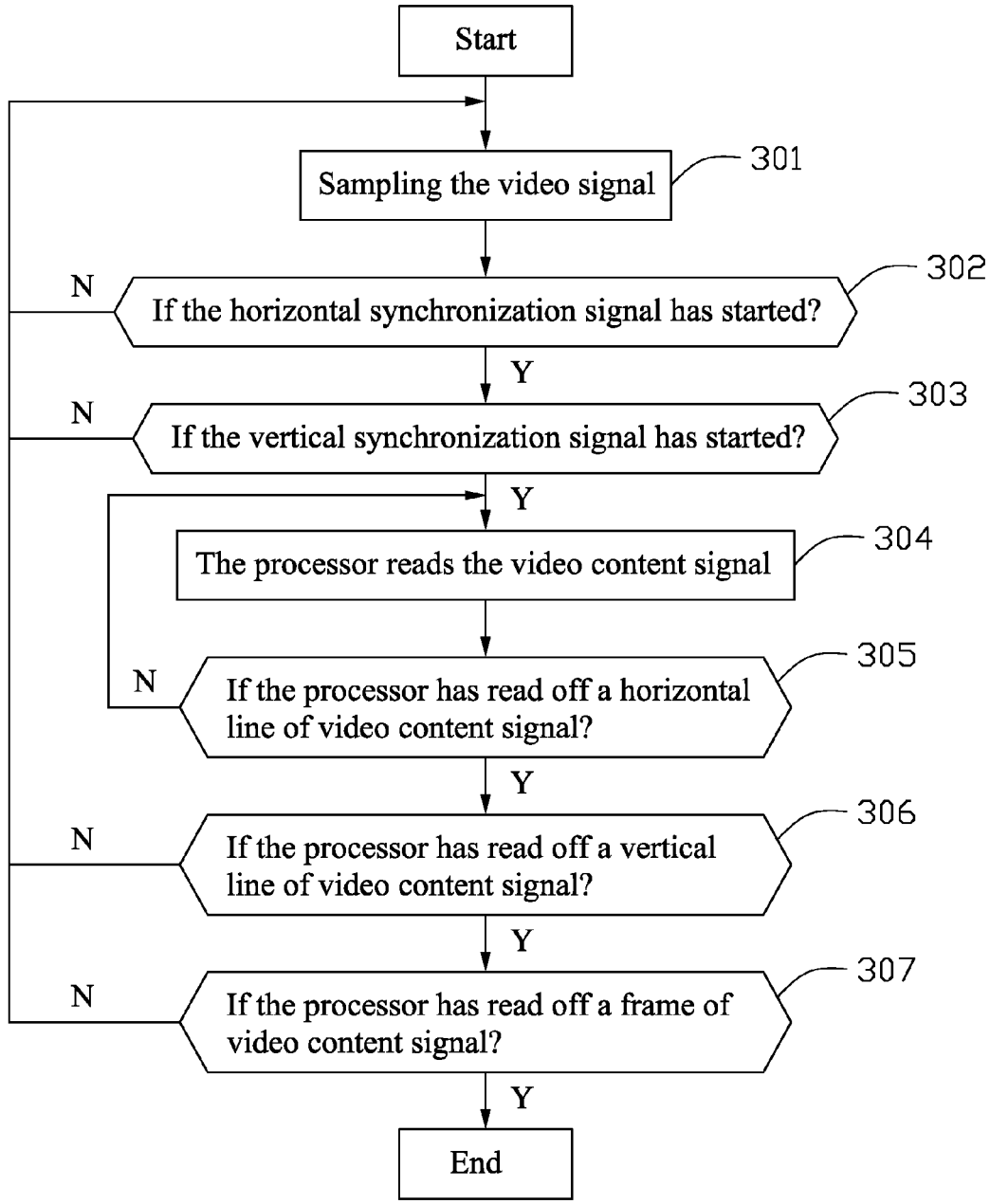
FIG. 3 is flow chart of the circuit of FIG. 1 processing a video signal.

Referring to FIG. 3, a flow of the circuit processing a video signal is shown as follows:

In step 301, the data register 13 and the status register 15 sample and store the video signal at the rising edge of the sampling clock signal; the data register 13 stores the video content signal of the video signal; the status register 15 stores the horizontal synchronization signal, the vertical synchronization signal, and the frame synchronization signal of the video signal; then go to step 302.

In step 302, check if the horizontal synchronization signal has started; if started, go to step 303; if not started, go back to step 301.

In step 303, check if the vertical synchronization signal has started; if started, go to step 304; if not started, go back to step 301.

In step 304, the processor 11 reads the video content signal from the data register 13 according to the horizontal synchronization signal, the vertical synchronization signal, and the frame synchronization signal; then go to step 305.

In step 305, check if the processor 11 has read off a horizontal line of video content signal; if read off, go to step 306; if not read off, go back to step 304.

In step 306, check if the processor 11 has read off a vertical line of video content signal; if read off, go to step 307; if not read off, go back to step 304.

In step 307, check if the processor 11 has read off a frame of video content signal; if read off, go to step 308; if not read off, go back to step 304.

At last, the video signal has been processed, and the processing procedure is ended.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

It is also to be understood that the above description and the claims drawn to a method may include some indication in reference to certain steps. However, the indication used is only to be viewed for identification purposes and not as a suggestion as to an order for the steps.

What is claimed is:

1. A circuit for processing video signal from a video sensor, the video signal comprising video content signal and synchronization signals, the circuit comprising:

a data register storing the video content signal of the video signal;

a status register providing a sampling clock signal to the data register and the video sensor, the sampling clock signal being synchronized with the synchronization signals to sample the video signal, the status register storing the synchronization signals of the video content signal;

a processor coupled to the status register and the data register, the processor capable of reading the video content signal from the data register according to the synchronization signals in the status register; and wherein the status register has a state bit; when the data register stores data, the state bit is set to one; when the processor reads data from the data register, the state bit is set to zero;

wherein the processor is allowed to read data from the data register when the state bit is set to one, and disallowed to read data from the data register when the state bit is set to zero; and wherein the processor is coupled to the data register and status register via a control bus capable of controlling the data register and the status register; the data register and the status register are coupled to the processor via a data bus capable of transferring data to the processor.

2. The circuit of claim 1, wherein the synchronization signals comprises a horizontal synchronization signal, a vertical synchronization signal, and a frame synchronization signal.

3. The circuit of claim 1, wherein the data register and the status register sample and store data at a rising edge of the sampling clock signal.

4. A circuit for processing video signal which comprises video content signal and synchronization signals, the circuit comprising:

at least a register providing a sampling clock signal which is synchronized with the synchronization signal, the register capable of sampling the video signal according to the sampling clock signal, and storing the video content signal and the synchronization signals respectively;

wherein the at least a register comprises a status register which stores the synchronization signals, and a data register which stores the video content signal; and a processor coupled to the at least a register, and capable of reading the video content signal according to the synchronization signals; and wherein the status register has a state bit; when the data register stores data, the state bit is set to one; when the processor reads data from the data register, the state bit is set to zero; and wherein the processor is allowed to read data from the data register when the state bit is set to one, and disallowed to read data from the data register when the state bit is set to zero.

5. The circuit of claim 4, wherein the synchronization signals comprises a horizontal synchronization signal, a vertical synchronization signal, and a frame synchronization signal.

6. The circuit of claim 4, wherein the data register and the status register sample and store data at a rising edge of the sampling clock signal.

* * * * *